United States Patent
Kohler

[11] Patent Number: 5,841,106
[45] Date of Patent: Nov. 24, 1998

[54] HEATED WINDSHIELD WIPER BLADE ASSEMBLY

[76] Inventor: Dalton C. Kohler, 2142 Ramona Dr, Pleasant Hill, Calif. 94523

[21] Appl. No.: 828,045

[22] Filed: Mar. 28, 1997

[51] Int. Cl.[6] .................................................. B60L 1/02
[52] U.S. Cl. .......................... 219/202; 219/385; 219/528; 219/535
[58] Field of Search .................................... 219/385, 386, 219/528, 203, 202, 535

[56] References Cited

U.S. PATENT DOCUMENTS

| 5,488,752 | 2/1996 | Randolph | 219/202 |
| 5,676,868 | 10/1997 | Simmons | 219/202 |

Primary Examiner—Teresa J. Walberg
Assistant Examiner—Quan Nguyen

[57] ABSTRACT

A new Heated Windshield Wiper Blade Assembly for preventing the build up of ice and snow accumulation thereon which can impair the effectiveness of the windshield wiper blades in clearing the windshield of cold weather precipitation. The inventive device includes an external heating coil attached to a windshield wiper blade member by a plurality of heating coil securing pins and positioned next to the blade portion of the windshield wiper blade member. The vehicle's battery is electrically coupled to the external heating coil to heat the external heating coil. A heating coil activation switch in the interior of the vehicle allows a user to selectively energize the external heating coil.

11 Claims, 3 Drawing Sheets

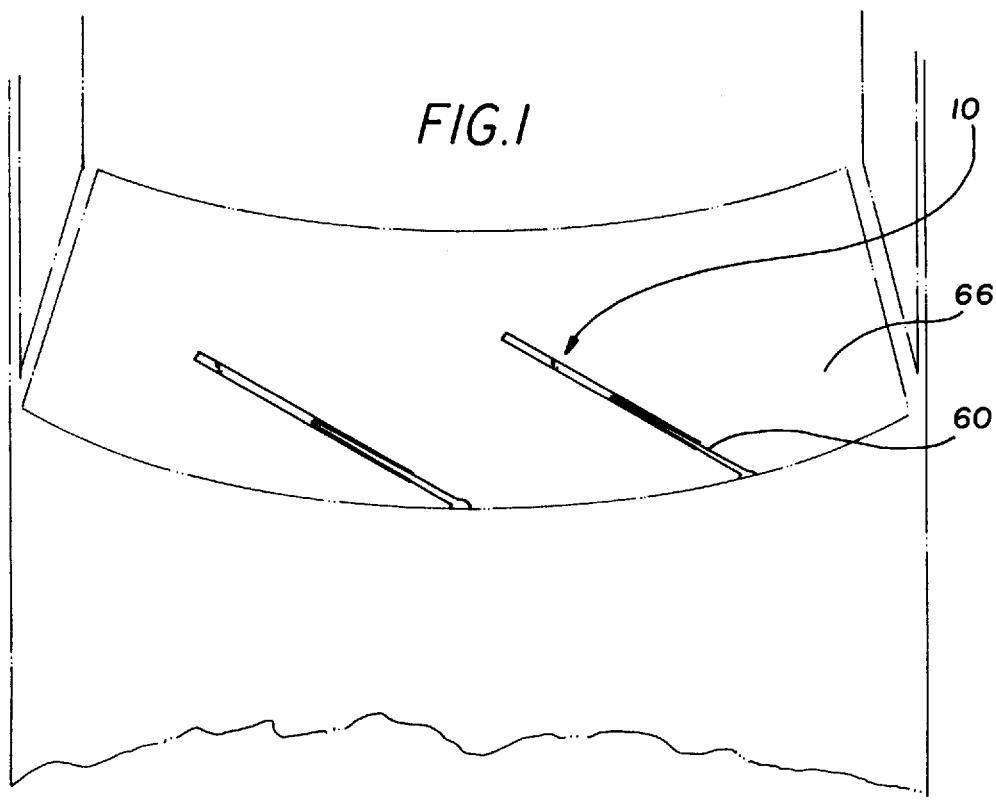
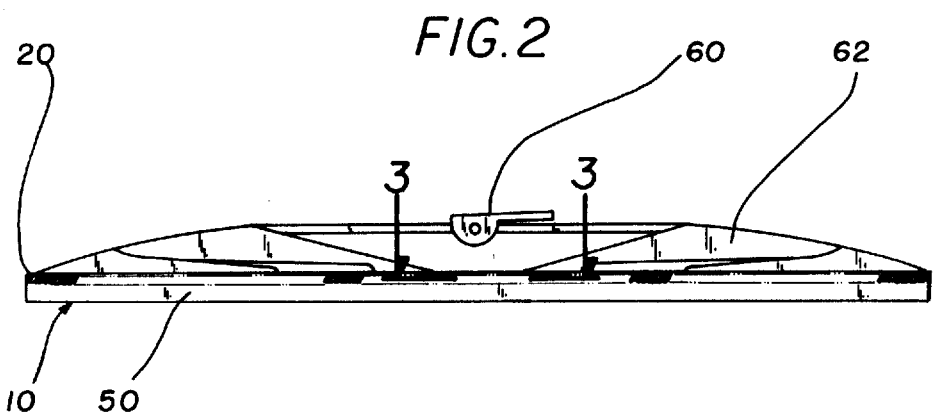

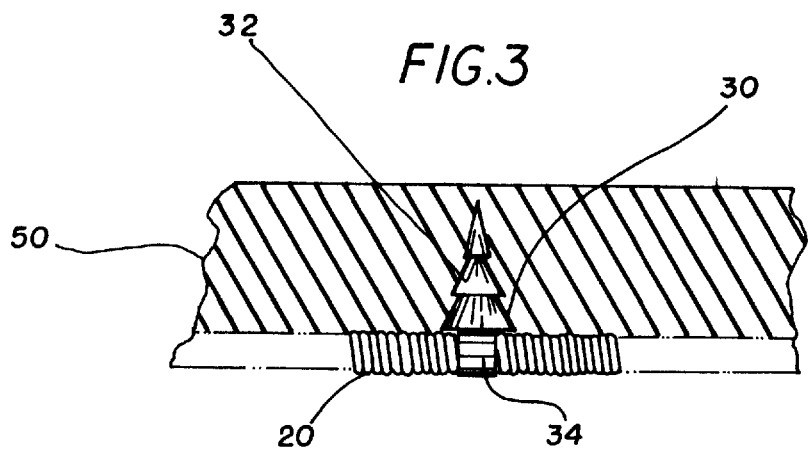
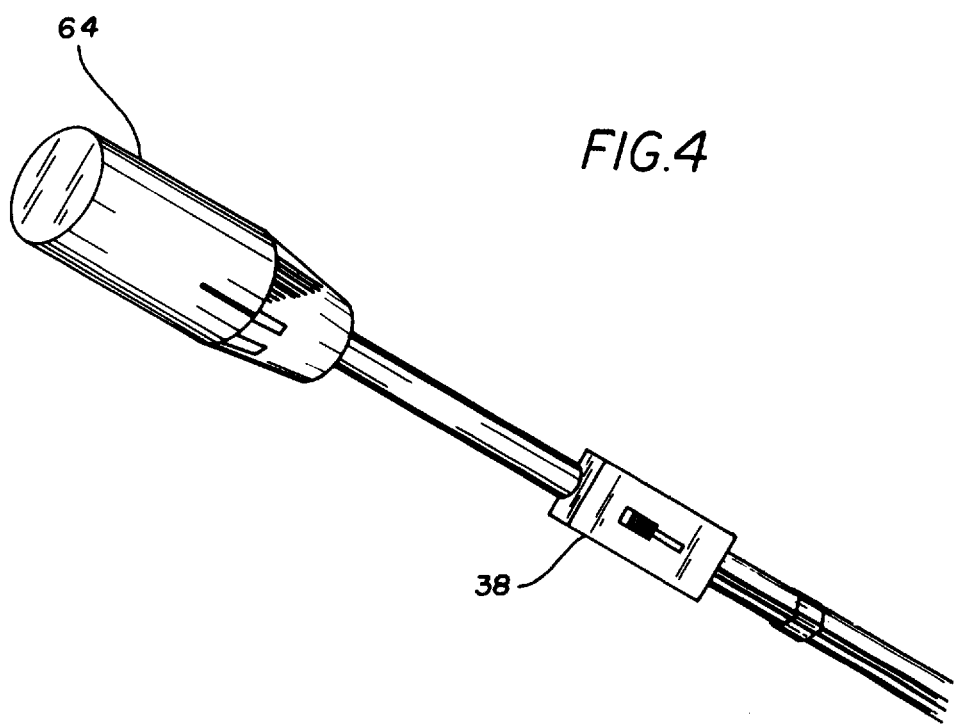

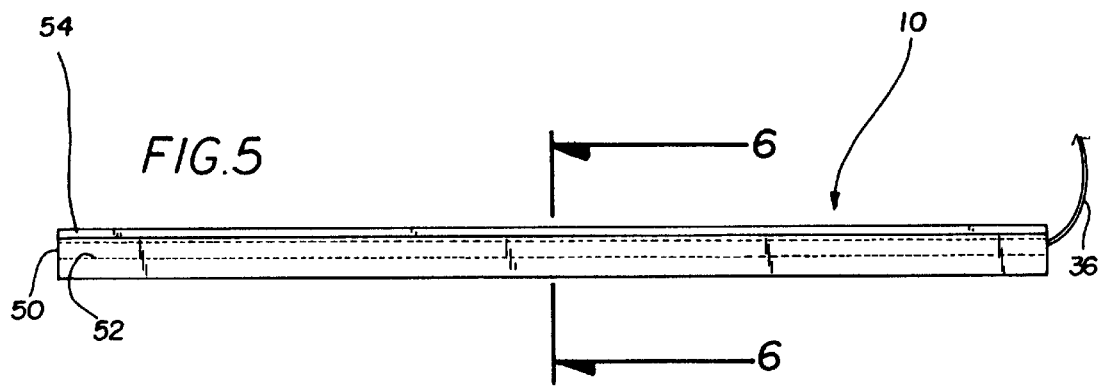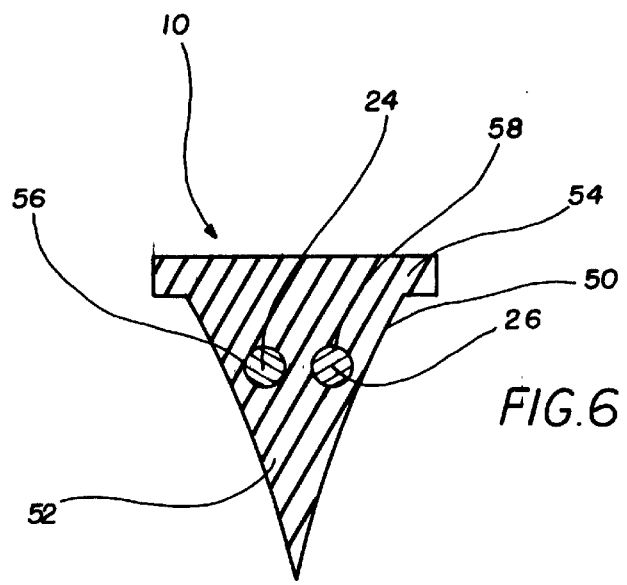

HEATED WINDSHIELD WIPER BLADE ASSEMBLY

BACKGROUND OF THE INVENTION

1. Field of the Invention

The present invention relates to windshield wiper systems for vehicles and more particularly pertains to a new Heated Windshield Wiper Blade Assembly for preventing the build up of ice and snow accumulation thereon which can impair the effectiveness of the windshield wiper blades in clearing the windshield of cold weather precipitation.

2. Description of the Prior Art

The use of windshield wiper systems for vehicles is known in the prior art. More specifically, windshield wiper systems for vehicles heretofore devised and utilized are known to consist basically of familiar, expected and obvious structural configurations, notwithstanding the myriad of designs encompassed by the crowded prior art which have been developed for the fulfillment of countless objectives and requirements.

Known prior art windshield wiper systems for vehicles include U.S. Pat. No. 4,967,437; U.S. Pat. No. 5,325,561; U.S. Pat. No. Des. 341,115; U.S. Pat. No. 4,670,933; U.S. Pat. No. 4,928,344 and U.S. Pat. No. Des. 324,014.

While these devices fulfill their respective, particular objectives and requirements, the aforementioned patents do not disclose a new Heated Windshield Wiper Blade Assembly. The inventive device includes an external heating coil attached to a windshield wiper blade member by a plurality of heating coil securing pins and positioned next to the blade portion of the windshield wiper blade member. The vehicle's battery is electrically coupled to the external heating coil to heat the external heating coil. A heating coil activation switch in the interior of the vehicle allows a user to selectively energize the external heating coil.

In these respects, the Heated Windshield Wiper Blade Assembly according to the present invention substantially departs from the conventional concepts and designs of the prior art, and in so doing provides an apparatus primarily developed for the purpose of preventing the build up of ice and snow accumulation thereon which can impair the effectiveness of the windshield wiper blades in clearing the windshield of cold weather precipitation.

SUMMARY OF THE INVENTION

In view of the foregoing disadvantages inherent in the known types of windshield wiper systems for vehicles now present in the prior art, the present invention provides a new Heated Windshield Wiper Blade Assembly construction wherein the same can be utilized for preventing the build up of ice and snow accumulation thereon which can impair the effectiveness of the windshield wiper blades in clearing the windshield of cold weather precipitation.

The general purpose of the present invention, which will be described subsequently in greater detail, is to provide a new Heated Windshield Wiper Blade Assembly apparatus and method which has many of the advantages of the windshield wiper systems for vehicles mentioned heretofore and many novel features that result in a new Heated Windshield Wiper Blade Assembly which is not anticipated, rendered obvious, suggested, or even implied by any of the prior art windshield wiper systems for vehicles, either alone or in any combination thereof.

To attain this, the present invention generally comprises an external heating coil attached to a windshield wiper blade member by a plurality of heating coil securing pins and positioned next to the blade portion of the windshield wiper blade member. The vehicle's battery is electrically coupled to the external heating coil to heat the external heating coil. A heating coil activation switch in the interior of the vehicle allows a user to selectively energize the external heating coil.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new Heated Windshield Wiper Blade Assembly apparatus and method which has many of the advantages of the windshield wiper systems for vehicles mentioned heretofore and many novel features that result in a new Heated Windshield Wiper Blade Assembly which is not anticipated, rendered obvious, suggested, or even implied by any of the prior art windshield wiper systems for vehicles, either alone or in any combination thereof.

It is another object of the present invention to provide a new Heated Windshield Wiper Blade Assembly which may be easily and efficiently manufactured and marketed.

It is a further object of the present invention to provide a new Heated Windshield Wiper Blade Assembly which is of a durable and reliable construction.

An even further object of the present invention is to provide a new Heated Windshield Wiper Blade Assembly which is susceptible of a low cost of manufacture with regard to both materials and labor, and which accordingly is then susceptible of low prices of sale to the consuming public, thereby making such Heated Windshield Wiper Blade Assembly economically available to the buying public.

Still yet another object of the present invention is to provide a new Heated Windshield Wiper Blade Assembly which provides in the apparatuses and methods of the prior art some of the advantages thereof, while simultaneously overcoming some of the disadvantages normally associated therewith.

Still another object of the present invention is to provide a new Heated Windshield Wiper Blade Assembly for preventing the build up of ice and snow accumulation thereon which can impair the effectiveness of the windshield wiper blades in clearing the windshield of cold weather precipitation.

Yet another object of the present invention is to provide a new Heated Windshield Wiper Blade Assembly which includes an external heating coil attached to a windshield wiper blade member by a plurality of heating coil securing pins and positioned next to the blade portion of the windshield wiper blade member. The vehicle's battery is electrically coupled to the external heating coil to heat the external heating coil. A heating coil activation switch in the interior of the vehicle allows a user to selectively energize the external heating coil.

Still yet another object of the present invention is to provide a new Heated Windshield Wiper Blade Assembly that is easily installed on any vehicle.

Even still another object of the present invention is to provide a new Heated Windshield Wiper Blade Assembly that helps improve a driver's visibility through a windshield in snowy or icy conditions.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a top perspective view of a new Heated Windshield Wiper Blade Assembly in use on a vehicle's windshield according to the present invention.

FIG. 2 is a side view of a Heated Windshield Wiper Blade Assembly.

FIG. 3 is a cross sectional view taken along line 3—3 of FIG. 2.

FIG. 4 is a perspective view of the heating coil activation switch mounted to the wiper control mechanism.

FIG. 5 is side view of a Heated Windshield Wiper Blade Assembly having internal heating coils.

FIG. 6 is a cross sectional view taken along line 6—6 of FIG. 1.

DESCRIPTION OF THE PREFERRED EMBODIMENT

With reference now to the drawings, and in particular to FIGS. 1 through 6 thereof, a new Heated Windshield Wiper Blade Assembly embodying the principles and concepts of the present invention and generally designated by the reference numeral 10 will be described.

More specifically, it will be noted that the Heated Windshield Wiper Blade Assembly 10 comprises an external heating coil 20 and a windshield wiper blade member 50 and a plurality of heating coil securing pins 30.

As best illustrated in FIGS. 1 through 6, it can be shown that the Heated Windshield Wiper Blade Assembly 10 is designed for an oscillating wiper arm 60 of a vehicle that usually includes at least one wiper blade carrier arm 62 and is activated by a wiper control mechanism 64 usually located in the interior of the vehicle.

The windshield wiper blade member 50 has a blade portion 52 designed to remove precipitation and debris from the vehicle's windshield 66. The windshield wiper blade member 50 also includes a carrier arm flange portion 54 which is mounted to the wiper blade carrier arms 62 thereby holding the windshield wiper blade member 50 against the windshield 66.

An external heating coil 20 is postioned next to the blade portion 52 and extends the length of the windshield wiper blade member 20. The extenal heating coil 20 provides heat along the length of the windshield wiper blade member 50. The temperature of the heat provided should be sufficient enough to melt accumulating ice or snow on the windshield wiper blade member 50. The external heating coil 20 is attached to the windshield wiper blade member 50 by a plurality of heating securing pins 30.

The heating securing pins 30 have a heating coil attachment portion 34 which attaches to the external heating coil 20. The heating securing pins 30 also have a blade securing portion 32 which is inserted into the windshield wiper blade member 50 and secures the external heating coil 20 to the windshield wiper blade member 50.

The Heated Windshield Wiper Blade Assembly 10 is externally powered by the vehicle's battery (not pictured). The battery is operatively connected to the external heating coil 20 by electrical wire 36. The external heating coil 20 is heated by the energy provided by the battery.

A heating coil activation switch 38 is operatively connected to the external heating coil 20 to selectively energize the external heating coil 20. The heating coil activation switch 38 may be located within the interior of the vehicle and may be mounted to the vehicle's wiper control mechanism 64. Optionally, a heating tempture adjustment means (not pictured) may be included in the heating coil activation switch 38 to allow adjustment of the heating temperature of the the external heating coil 20.

As a variation to the Heated Windshield Wiper Blade Assembly 10, the external heating coil 20 may be replaced with a first internal heating coil 24 and a second internal heating coil 26. In this variation, a first internal heating coil bore 56 and a second internal heating coil bore 58 extending longitudinally within the windshield wiper blade member 50. The first internal heating coil 24 is disposed within the first internal heating coil bore 56 and the second internal heating coil 26 is disposed within the second internal heating coil bore 58.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A heated windshield wiper blade assembly, for an oscillating wiper arm having at least one wiper blade carrier arm, said heated windshield wiper blade assembly comprising:

a windshield wiper blade member having a blade portion and a carrier arm flange portion, said carrier arm flange portion being mounted on said wiper blade carrier arm;

a plurality of heating coil securing pins, each of said plurality of heating coil securing pins having a blade securing portion and a heating coil attachment portion, said blade securing portion including a number of aligned generally cone-shaped portions, said generally cone-shaped portions being for insertion into said wiper blade member, said windshield wiper blade member accepting each said blade securing portion of each of said plurality of heating coil securing pins; and an external heating coil being positioned next to said blade portion of said windshield wiper blade member, said external heating coil further being coupled to said heating coil attachment portions of said heating securing pins, said extenal heating coil providing heat to said windshield wiper blade member for melting accumulating ice or snow on said windshield wiper blade member.

2. The heated windshield wiper blade assembly of claim 1, further comprising an extenal power source, said external power source being operatively coupled to said external heating coil, said extenal power source providing energy to said extenal heating coil for enabling said external heating coil to provide heat to said windshield wiper blade member.

3. The heated windshield wiper blade assembly of claim 2, wherein said external power source is a battery.

4. The heated windshield wiper blade assembly of claim 1, further comprising a means for selectively energizing said external heating coil.

5. The heated windshield wiper blade assembly of claim 4, wherein said means for selectively energizing said external heating coil is a heating coil activation switch, said heating coil activation switch being operatively coupled to said external heating coil.

6. A heated windshield wiper blade assembly, for an oscillating wiper arm having at least one wiper blade carrier arm, said heated windshield wiper blade assembly comprising:

a windshield wiper blade member having a blade portion, a carrier arm flange portion, a first internal heating coil bore, and a second internal heating coil bore, said carrier arm flange portion being adapted for mounting on said wiper blade carrier arm;

a first internal heating coil being disposed in said first internal heating coil bore; and a second internal heating coil being disposed in said second internal heating coil bore.

7. The heated windshield wiper blade assembly of claim 6, further comprising an extenal power source, said external power source being operatively coupled to said first internal heating coil and said second internal heating coil, said extenal power source providing energy to said first intenal heating coil and said second intenal heating coil enabling to provide heat to said windshield wiper blade member.

8. The heated windshield wiper blade assembly of claim 7, wherein said external power source is a battery.

9. The heated windshield wiper blade assembly of claim 6, further comprising a means to selectively energize said first internal heating coil and said second internal heating coil.

10. The heated windshield wiper blade assembly of claim 9, wherein said means to selectively energize energize said first internal heating coil and said second internal heating coil is a heating coil activation switch being operatively coupled to energize said first internal heating coil and said second internal heating coil.

11. A heated windshield wiper blade assembly, for an oscillating wiper arm having at least one wiper blade carrier arm, said heated windshield wiper blade assembly comprising:

a windshield wiper blade member having a blade portion and a carrier arm flange portion, said carrier arm flange portion being mounted on said wiper blade carrier arm;

a plurality of heating coil securing pins, each of said plurality of heating coil securing pins having a blade securing portion and a heating coil attachment portion, said blade securing portion including a number of aligned generally cone shaped portions, said cone-shaped portions being for insertion into said wiper blade member, said windshield wiper blade member accepting each said blade securing portion of each of said plurality of heating coil securing pins; and an external heating coil being positioned next to said blade portion of said windshield wiper blade member, said external heating coil further being coupled to said heating coil attachment portions of said heating securing pins, said extenal heating coil providing heat to said windshield wiper blade member for melting accumulating ice or snow on said windshield wiper blade member;

an extenal power source, said external power source being operatively coupled to said external heating coil, said extenal power source providing energy to said extenal heating coil for enabling said external heating coil to provide heat to said windshield wiper blade member;

wherein said external power source is a battery;

a means for selectively energizing said external heating coil; and wherein said means for selectively energizing said external heating coil is a heating coil activation switch, said heating coil activation switch being operatively coupled to said external heating coil.

* * * * *